United States Patent [19]

Liepins et al.

[11] Patent Number: 5,271,870
[45] Date of Patent: Dec. 21, 1993

[54] PROCESS FOR INTRODUCING ELECTRICAL CONDUCTIVITY INTO HIGH-TEMPERATURE POLYMERIC MATERIALS

[75] Inventors: Raimond Liepins, Los Alamos; Betty S. Jorgensen, Jemez Springs; Leila Z. Liepins, Los Alamos, all of N. Mex.

[73] Assignee: The United States of America as represented by the Department of Energy, Washington, D.C.

[21] Appl. No.: 371,859

[22] Filed: Jun. 27, 1989

Related U.S. Application Data

[62] Division of Ser. No. 91,251, Aug. 27, 1987, Pat. No. 4,876,032.

[51] Int. Cl.$^5$ .......................... H01B 1/00; H01B 1/20
[52] U.S. Cl. ................................ 252/518; 252/514; 430/531; 430/631; 106/126; 427/301; 427/322; 427/383.1
[58] Field of Search ................. 252/514, 518; 430/531, 430/631, 945; 106/1.26, 1.28; 427/301, 307, 322, 383.1

[56] References Cited

U.S. PATENT DOCUMENTS

| | | | |
|---|---|---|---|
| 4,246,320 | 1/1981 | Coll-Palagos et al. | 427/306 |
| 4,663,199 | 5/1987 | Liebler et al. | 427/304 |
| 4,755,326 | 7/1988 | Liepins et al. | 252/518 |

OTHER PUBLICATIONS

R. Liepins et al., "High Temperature Conductive Polymers II, A. New Technique . . . " Synthetic Metals 15, pp. 249-258 Aug. 28, 1986.

"Metalization Patterns by Thermal Decomposition," NASA's Jet Propulsion Lab., Pasadena, Calif. NASA Tech. Briefs, pp. 163-164 (1985).

R. Liepins et al., "Electride Doping of Soluble High Temperature Polymers," Mol. Cryst. Liq. 105, 151-159 (1984).

"Heart Cut," Chemtech. p. 389 (Jul. 1987).

*Primary Examiner*—Paul Lieberman
*Assistant Examiner*—M. Kopec
*Attorney, Agent, or Firm*—Samuel M. Freund; Paul D. Gaetjens; William R. Moser

[57] ABSTRACT

High-temperature electrically conducting polymers. The in situ reactions: $AgNO_3+RCHO \rightarrow Ag^\circ + RCOOH$ and $R_3M \rightarrow M^\circ + 3R$, where M=Au or Pt have been found to introduce either substantial bulk or surface conductivity in high-temperature polymers. The reactions involving the $R_3M$ were caused to proceed thermally suggesting the possibility of using laser means for initiating such reactions in selected areas or volumes of the polymeric materials. The polymers successfully investigated to date are polyphenylquinoxaline, polytolylquinoxaline, polyquinoline, polythiazole, and pyrrone.

11 Claims, No Drawings

PROCESS FOR INTRODUCING ELECTRICAL CONDUCTIVITY INTO HIGH-TEMPERATURE POLYMERIC MATERIALS

This invention is the result of a contract with the Department of Energy (Contract No. W-7405-ENG-36).

This is a division of application Ser. No. 091,251, filed Aug. 27, 1987, now U.S. Pat. No. 4,876,032.

BACKGROUND OF THE INVENTION

The present invention relates generally to the preparation of electrically conducting polymers, and more particularly to the preparation of environmentally stable electrically conducting high-temperature polymers.

Electrically conducting [$\sigma \geq 1$ ($\Omega$ cm)$^{-1}$], soluble, high-temperature polymeric materials have recently emerged as an interesting class of materials. R. Liepins and M. Aldissi have reported electrode doping of high-temperature polymers in Mol. Cryst. Liq. Cryst. 105, 151 (1984). Unfortunately, all of the currently used n- or p-dopants have resulted in environmentally unstable conducting polymers. It was originally hoped that cesium electride and cesium ceside as n-dopants would provide a significant increase in environmental stability in polymers doped therewith. However, although increased stability relative to potassium naphthalide-doped materials was observed, the electride-doped materials were still found to be unstable.

Accordingly, it is an object of the present invention to provide a process for the preparation of environmentally stable, conducting [$\sigma \geq 1$ ($\Omega$ cm)$^{-1}$] polymeric materials.

Another object of the present invention is to provide a process for the preparation of environmentally stable, conducting polymeric materials stable to at least 300° C.

Yet another object of our invention is to provide articles fabricated from environmentally stable, high-temperature conducting [$\sigma \geq 1$ ($\Omega$ cm)$^{-1}$] polymeric materials.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects and in accordance with the purpose of the present invention, as embodied and broadly described herein, the process for preparing environmentally stable, bulk electrically conducting high-temperature polymeric materials hereof may include the steps of: preparing a solution of the polymer of interest in a suitable solvent, adding a solution of AgNO$_3$ in a suitable solvent, adding a solution comprising an aldehyde, and drying the resulting solution.

In a further aspect of the present invention, in accordance with its objects and purposes, the process for preparing environmentally stable, bulk electrically conducting high-temperature polymeric materials hereof may include the steps of: preparing a solution of the polymer of interest in an appropriate solvent, adding a solution comprising metallic species in the form of an organometallic compound, and heating the resulting solution for sufficient time and at a temperature sufficient to release the metallic species from the organometallic compound in the form of metal atoms.

In yet a further aspect of the present invention, in accordance with its objects and purposes, the process for depositing electrically conducting films on surfaces of high-temperature polymers hereof may include the steps of: preparing a film of the high-temperature polymer of interest, placing the polymeric film into a solution comprising AgNO$_3$ and a reducing agent therefor for a time period sufficient to permit the silver atoms produced thereby to coat the surface of the high-temperature polymer.

In still a further aspect of our invention, in accordance with its objects and purposes, the process for depositing electrically conducting films on surfaces of high-temperature polymers hereof may include the steps of: preparing a film of the high-temperature polymer of interest, soaking the film in an organic solvent, dipping the swollen film produced thereby in a solution comprising metallic atoms in the form of an organometallic compound for a period of time sufficient to permit the organometallic compound to permeate the swollen polymeric film, drying the permeated film produced thereby, and heating the dried permeated polymeric film at sufficient temperature for sufficient time to permit the release of the metallic species from the organometallic compound as metal atoms.

In another aspect of the present invention, in accordance with its objects and purposes, the electrically conducting, environmentally stable articles hereof may include metal-atom permeated, conducting high-temperature polymers.

Benefits and advantages of our invention include simplicity of preparation and environmental stability of the resulting high-temperature electrically conducting polymeric materials.

DETAILED DESCRIPTION OF THE PREFERRED EMBODIMENTS OF THE INVENTION

Briefly, the present invention includes the use of the following in situ reactions: AgNO$_3$+RCHO→Ag°+RCOOH and R$_3$M→M°+3R, where M=Au or Pt, to introduce either bulk or surface electrical conductivity in high-temperature, polymeric materials. The high-temperature polymers investigated and evaluated were polyquinolines, polyphenylquinoxalines, pyrrone, and polythiazole although many other polymers would be suitable for introduction of conductivity thereto according to the teachings of our invention. These polymers were prepared from the monomeric materials by well-known syntheses. The reaction involving AgNO$_3$ to produce Ag° was a purely chemical procedure, while the release of Au or Pt from R$_3$M was accomplished thermally. This latter reaction could also be achieved by use of a laser for establishing regions of conductivity on the surface of a sample. It is further anticipated that regions of bulk conductivity could be introduced by choosing the appropriate laser wavelength or wavelength from another source of electromagnetic radiation to match a particular photodissociative reaction of a chosen organometallic compound freeing the metal atoms thereby.

The term "doping" is used in its broadest sense and includes the processes of generation and incorporation of atomic species of various metals in high-temperature polymers. In this sense the meaning of doping refers to charge polarization and metal-atom complexation with the double bonds. By contrast to previous procedures, the process hereof does not result in the alteration of the polymeric material itself. As mentioned, the generation of the atomic species may be done chemically or thermally and in bulk or at the surface of the polymer film. Having generally described the subject invention, the following specific examples are presented as a further illustration thereof.

EXAMPLE 1

Films of polyquinolines, pyrrone, polyphenylquinoxaline and polythiazole were surface doped with silver, gold and platinum, giving highly conducting materials that were air stable.

For the silver doping the procedure consisted of placing a film of the polymer in a 1:1 molar solution of $AgNO_3$ and a reducing agent such as formaldehyde, paraformaldehyde, terephthalaldehyde or isoascorbic acid in dimethyl sulfoxide for about half an hour to four hours. Other reducing agents are also contemplated. To improve the penetration and adhesion of the in situ generated silver, the polymer film was soaked in a hot organic solvent for about 15 minutes and/or etched by a hot KOH or chromic acid prior to being placed in the $AgNO_3$ plus reducing agent solution.

The etching treatment consisted of placing the film in a 30% aqueous KOH solution at about 100° C. for up to 15 minutes or in a sodium dichromate-sulfuric acid solution for 30 seconds at approximately 100° C. The film is then washed in water and immediately immersed in the reducing agent solution followed by the addition of the $AgNO_3$ solution. The silver coating deposited on the polymer film cannot be removed without the removal of the polymer. The underlying polymer is also highly conducting, although less so than the silver coated surface.

EXAMPLE 2

For the gold and platinum doping the procedure consisted of soaking the polyphenylquinoxaline film in p-xylene at room temperature for about 48 hours followed by immediate dipping in an organogold solution sold under the tradename of "Bright Gold Ink, NW" by Engelhard Industries, Inc. Following the dipping step, the coated films were placed in a clean plastic box and allowed to dry at room temperature for about two hours and then in a vacuum oven at about 50° C. for approximately 16 hours. The post-treatment for introducing high conductivity included heat treating the doped films at 130° C. for about 16 hours followed by heating at approximately 300° C. for about two hours. Optical and X-ray contact microradiography examination of the cross-section of the film showed that the gold had penetrated the film to a depth of 5–6 $\mu m$.

For the platinum doping an organoplatinum solution sold under the tradename of "Bright Platinum 05X" by Engelhard Industries, Inc. was used and the post-treatment included heat treating the film at about 300° C. for approximately 16 hours.

Alternatively, the post-treatment may include an oxygen low-pressure plasma treatment of the surface of the film at room temperature to generate the conductivity.

EXAMPLE 3

Polyphenylquinoxalines Nos. 3 to 6 were bulk doped with silver and gold. Typical sample preparation included the following. All solutions were prepared in m-cresol: 1M solutions of $AgNO_3$ and crown ether 18C6 solutions were combined and then added to the 20% polyphenylquinoxaline solution and followed by the terephthalaldehyde solution. The resulting solution was spread on a glass plate and the product film was dried at about 120° C. for 16 hours followed by 1 hour at approximately 350° C. The crown ether was employed in order to complex the silver ions to reduce the rate of formation of silver atoms when the reducing agent is added, thereby avoiding bulk precipitation. Other methods to achieve this result are contemplated to include cooling the solutions and using other complexing agents.

EXAMPLE 4

For the gold doping, polyphenylquinoxaline solutions were prepared as in Example 3 hereof and Engelhard's "Bright Gold Ink, NW" solution, diluted with m-cresol in a 2:1 ratio, was used. The combined solutions were spread on a glass plate and dried on a hot plate at about 150° C. for 16 hours followed for 1 hour at 350° C.

The conductivity measurements were performed in ambient atmosphere using the ASTM B193-78 and D257-78 methods for bulk and surface conductivity determinations, respectively, on films from 5 to 140 $\mu m$ thick. The conductivities of the undoped polyquinoline No. 1, polyphenylquinoxaline No. 3, pyrrone No. 7, and polythiazole No. 8 are set forth in Table 1. Tables 2 and 3 illustrate doped film data. It was further found that after six months the conductivities of the doped polymers remained substantially the same as those recorded at the ten week mark.

TABLE 1

Conductivities of some undoped high temperature polymers

| Polymer | Conductivity $(\Omega\ cm)^{-1}$ |
| --- | --- |
| Polyquinoline, No. 1 | $3 \times 10^{-16}$ |
| Polyphenylquinoxaline, No. 3 | $2 \times 10^{-17}$ |
| Pyrrone, No. 7 | $6 \times 10^{-16}$ |
| Polythiazole, No. 8 | $6 \times 10^{-17}$ |

The foregoing description of the preferred embodiments of the invention has been presented for purposes of illustration and description. It is not intended to be exhaustive or to limit the invention to the precise form disclosed, and obviously many modifications and variations are possible in light of the above teaching. For example, laser irradiation of the sample might be employed to provide the heat required to release the metallic species from their organometallic origins as metal atoms. Moreover, the use of laser radiation to induce photochemical dissociation of chosen metal bearing compounds in order to generate metal atoms in situ is also contemplated. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

TABLE 2

Conductivities of silver surface-doped polymers

| Polymer | Conductivity $(\Omega \text{ cm})^{-1}$ | | % Ag |
|---|---|---|---|
| | Immediate | After 10 weeks | |
| Polyquinoline, No. 1 | 3738 | 3300 | 42 |
| Polyquinoline, No. 2 | 215 | 189 | |
| Pyrrone, No. 7 | 401 | 101 | 11 |
| Polythiazole, No. 8 | 12 | 4 | |

TABLE 3

Conductivities of silver and gold bulk-doped high-temperature polymers

| Polymer | Conductivity $(\Omega \text{ cm})^{-1}$ | % Ag or Au |
|---|---|---|
| Polyphenylquinoxaline, No. 3 Ag, 120° C./16 hours | $2 \times 10^{-2}$ | 23 |
| Polyphenylquinoxaline, No. 3 Ag, 120° C./16 hours, 350° C./1 hour | 33 | |
| Polyphenylquinoxaline, No. 3 Au, 150° C./16 hours, 350° C./1 hour | 0.4 | 33 |
| Polyphenylquinoxaline, No. 4 Au, 150° C./16 hours, 350° C./1 hour | $5 \times 10^{-2}$ | 29 |
| Polyphenylquinoxaline, No. 5 Au, 150° C./16 hours, 350° C./1 hour | 0.3 | |
| Polytolylquinoxaline, No. 6 Au, 150° C./16 hours, 350° C./1 hour | $3 \times 10^{-3}$ | |

What we claim is:

1. A process for depositing electrically conducting films on surfaces of high-temperature polymers which comprise the steps of:
    preparing a film of the high-temperature polymer, which is selected from the group consisting of polyphenylquinoxaline, polytolylquinoxaline, polyquinoline, polythiazole, and pyrrone; and
    placing the polymeric film into a solution comprising $AgNO_3$ and a reducing agent therefor, which is selected from the group consisting of formaldehyde, paraformaldehyde, terephthalaldehyde, and isoascorbic acid in dimethyl sulfoxide, for a time period sufficient to permit the silver atoms produced thereby to coat the surface of said high-temperature polymer.

2. The process as described in claim 1, further comprising the step of soaking said high-temperature polymeric film of interest in a bath organic solvent before said step of placing said film in the solution comprising $AgNO_3$ and a reducing agent therefor in order to improve the penetration and adhesion of the silver atoms on the polymeric film.

3. The process as described in claim 2, further comprising the steps of etching said high-temperature polymeric film of interest in a hot bath comprising chemicals selected from the group consisting of KOH and chromic acid and rinsing said etched high-temperature polymeric film produced thereby after said step of placing said high-temperature polymeric film of interest in a hot organic solvent and before said step of placing said film in the solution comprising $AgNO_3$ and a reducing agent therefor.

4. The process as described in claim 3, wherein said etched high-temperature polymeric film is first placed in a solution comprising said reducing agent for $AgNO_3$ and then said $AgNO_3$ is subsequently introduced.

5. The process as described in claim 1, further comprising the step of etching said high-temperature polymeric film of interest in a heated bath comprising chemicals selected from the group consisting of KOH and chromic acid and rinsing said etched high-temperature polymeric film produced thereby before said step of placing said film in the solution comprising $AgNO_3$ and a reducing agent therefor.

6. The process as described in claim 5, wherein said etched high-temperature polymeric film is first placed in a solution comprising said reducing agent for $AgNO_3$ and then said $AgNO_3$ is subsequently introduced.

7. A process for depositing electrically conducting films on surfaces of high-temperature polymers which comprises the steps of:
    preparing a film of the high-temperature polymer, which is selected form the group consisting of polyphenylquinoxaline, polytolylquinoxaline, polyquinoline, polythiazole, and pyrrone, soaking the film in an organic solvent;
    dipping the swollen film produced thereby in a solution comprising metallic atoms in the form of an organometallic compound having the form $R_3M$, where R is an organic moiety and M is the metallic species to be coated, for a period of time sufficient to permit the organometallic compound to permeate said swollen polymeric film;
    drying the permeated film produced thereby; and
    heating the dried permeated polymeric film at sufficient temperature for sufficient time to permit the release of the metallic species from the organometallic compound as metal atoms.

8. The process as described in claim 7, wherein the metallic species is selected from the group consisting of gold and platinum.

9. The process as described in claim 7, wherein said step of heating the solid produced from said step of drying to release the metallic species as metal atoms is performed using a laser directed at chosen areas desired to have substantial conductance.

10. A process for introducing electrical conductivity into bulk samples of high temperature polymeric materials which comprises the steps of:
    preparing a solution of the polymer, which is selected form the group consisting of polyphenylquinoxaline, polytolylquinoxaline, polyquinoline, polythiazole, and pyrrone in a suitable solvent;
    adding a solution comprising metallic species in the form of an organometallic compound having the form $R_3M$, where R is an organic moiety and M is the metallic species to be coated,; and
    irradiating the resulting solution with electromagnetic radiation having an appropriate wavelength to photodissociate the organometallic compound in order to release the metallic species therefrom as metal atoms.

11. The process as described in claim 10, wherein said step of photodissociating the organometallic compound is performed using laser means.

* * * * *